No. 790,082. PATENTED MAY 16, 1905.
E. W. SHAW.
FEEDER FOR HAY PRESSES.
APPLICATION FILED JULY 25, 1904.

3 SHEETS—SHEET 1.

No. 790,082. PATENTED MAY 16, 1905.
E. W. SHAW.
FEEDER FOR HAY PRESSES.
APPLICATION FILED JULY 25, 1904.

3 SHEETS—SHEET 2.

Witnesses
E. H. Reichenbach
W. C. Keyes

Inventor
E W Shaw
By
Chandlee Chandlee
Attorney

No. 790,082. PATENTED MAY 16, 1905.
E. W. SHAW.
FEEDER FOR HAY PRESSES.
APPLICATION FILED JULY 25, 1904.

3 SHEETS—SHEET 3.

Witnesses
C. K. Reichenbach.
W. C. O. Keyes.

Inventor
E. W. Shaw
Attorneys

No. 790,082.  
Patented May 16, 1905.

UNITED STATES PATENT OFFICE.

EUGENE W. SHAW, OF WEIR, KANSAS.

FEEDER FOR HAY-PRESSES.

SPECIFICATION forming part of Letters Patent No. 790,082, dated May 16, 1905.

Application filed July 25, 1904. Serial No. 218,058.

*To all whom it may concern:*

Be it known that I, EUGENE W. SHAW, a citizen of the United States, residing at Weir, in the county of Cherokee and State of Kansas, have invented certain new and useful Improvements in Feeders for Hay-Presses; and I do hereby declare the following to be a full, clear, and exact description of the invention, such as will enable others skilled in the art to which it appertains to make and use the same.

This invention relates to feeding mechanisms for hay-presses; and it has for its object to provide a construction wherein the hay will be fed to the hopper intermittently in sufficient quantities to form bales and in which the entire manipulation of the hay from the time it is supplied to the feeder until the bale is formed in the baling-chamber ready for binding will be automatic.

Other objects and advantages of the invention will be understood from the following description.

Figure 1:
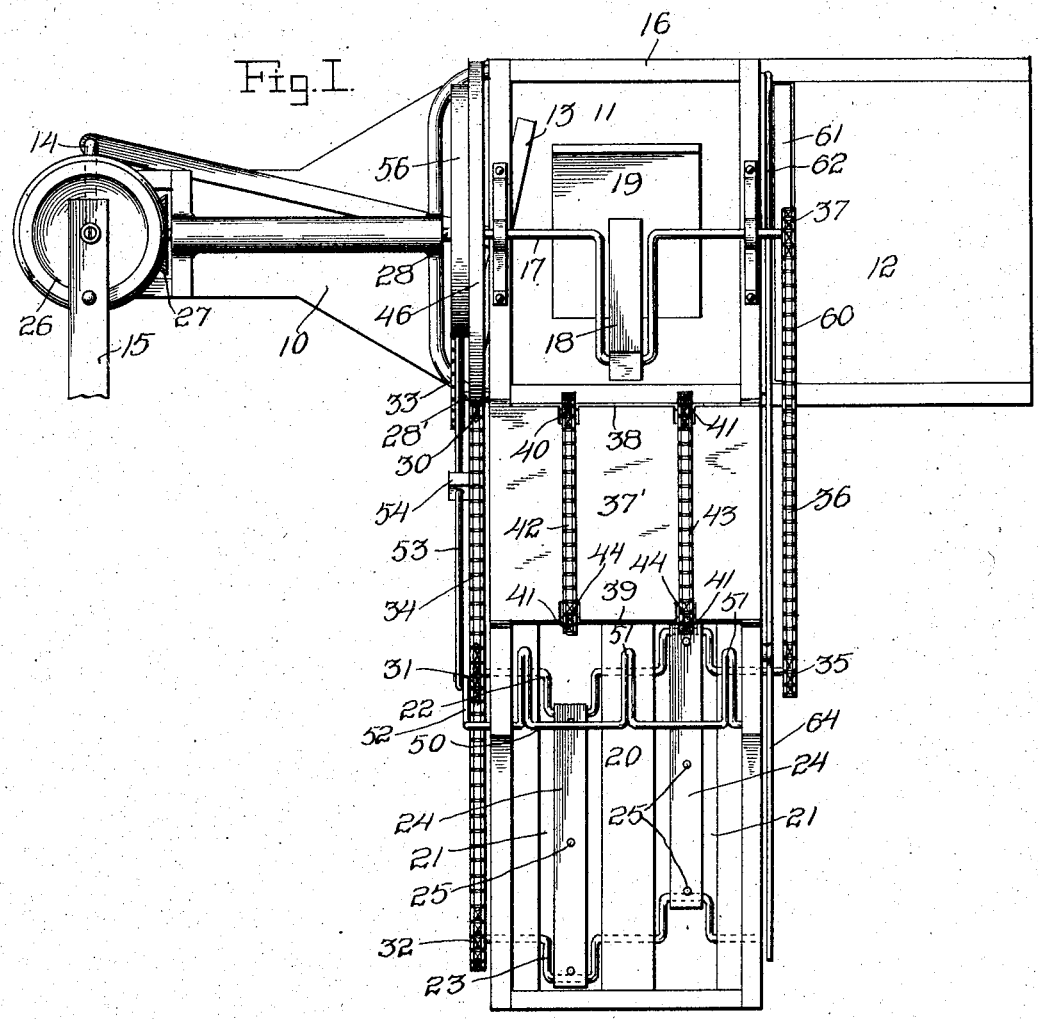
Figure 2:
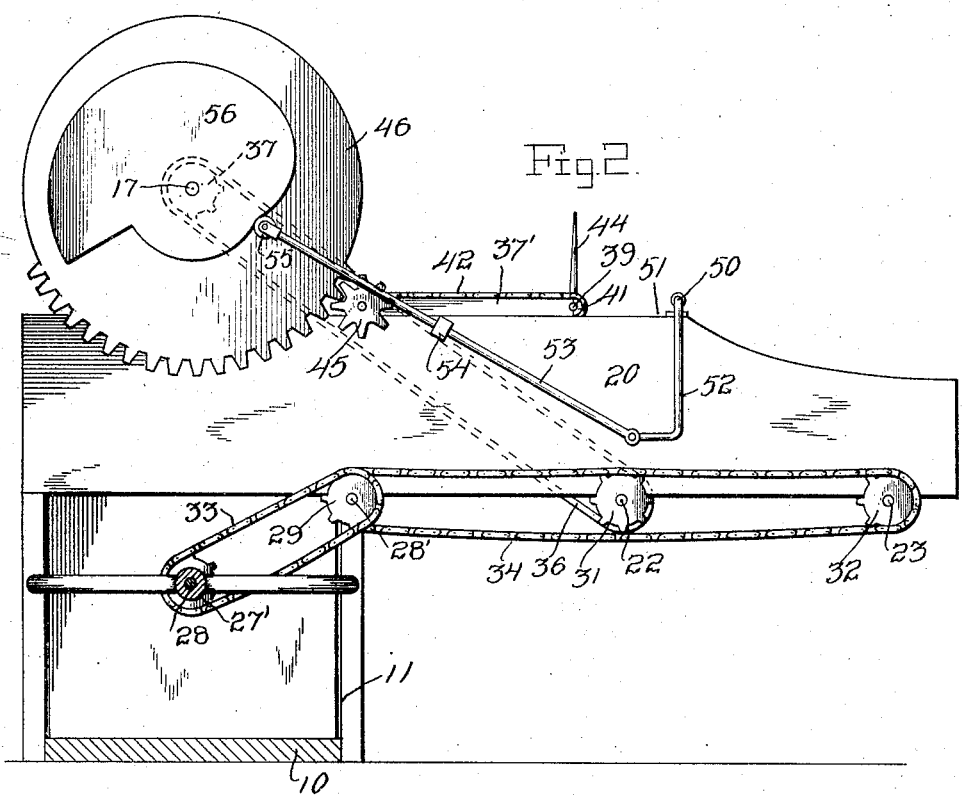
Figure 3:
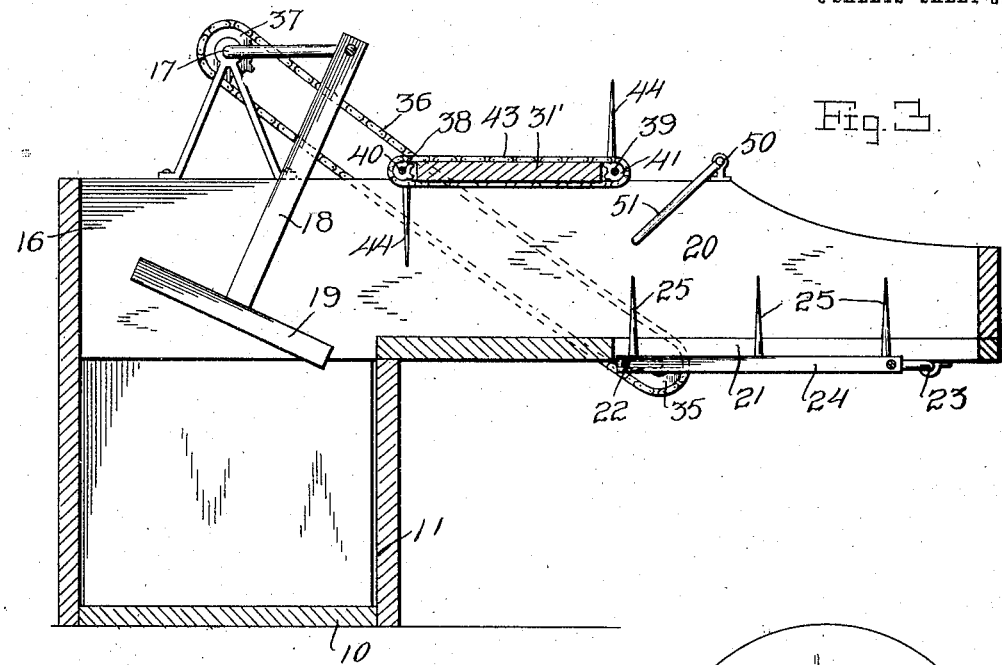
Figure 4:
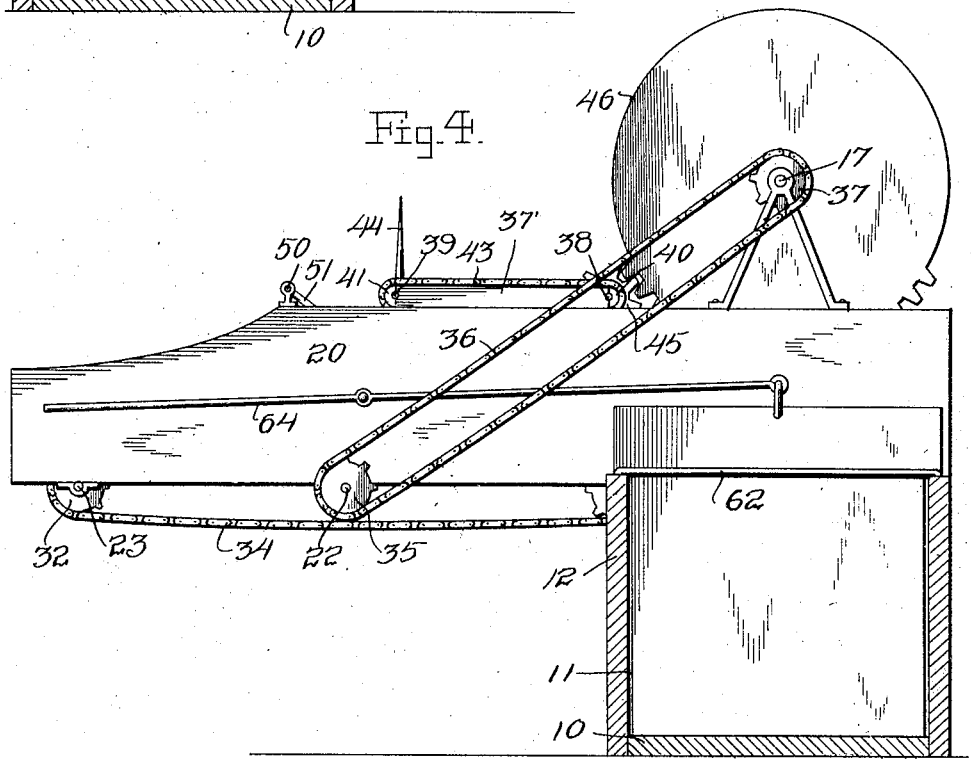

In the drawings forming a portion of this specification, and in which like numerals of reference indicate similar parts in the several views, Figure 1 is a top plan view showing a press embodying the present invention. Fig. 2 is a section taken transversely through the press in a vertical plane in advance of the baling-chamber, certain of the driving-chains being indicated in dotted lines. Fig. 3 is a section similar to Fig. 2, passing longitudinally through the feeder. Fig. 4 is a section similar to Fig. 2 at the opposite side of the feeding mechanism.

Referring now to the drawings, there is shown a common form of baling-press, including a base 10, upon which is a housing, including a baling-chamber 11 and a runway 12, extending therefrom and through which the bales are forced. A plunger 13 is employed, which is operated from a crank-shaft 14, provided with a sweep 15 for rotating it. Above the baling-chamber is a hopper 16, transversely of which is journaled a crank-shaft 17, to the crank of which is connected a rod 18, having an enlarged base 19, which rod and base form a tramper for forcing the hay or straw through the hopper and into the baling-chamber, the length of the crank being such that as the shaft rotates the base of the tramper will be raised sufficiently high to permit of passage of material through the side of the hopper beneath the base of the tramper, and the tramper will then be carried downwardly through the hopper and into the baling-chamber to press the material and hold it until the pressing-plunger has engaged it, the tramper rising from the baling-chamber as the plunger enters it.

One side of the hopper is open, and communicating therewith is a feeding-chute 20, into which the material is first placed and through which it is fed to the hopper. The outer end portion of the feeding-chute has its bottom slotted, as shown at 21, and at the ends of the slots are mounted double-crank shafts 22 and 23, the cranks of each shaft being disposed in opposite directions. There are two slots, as illustrated, and in each slot is disposed a bar 24, with which are pivotally engaged the corresponding cranks of the shafts, so that when the shafts are simultaneously rotated the bars will be alternately advanced in raised positions and returned in lowered positions, the advance movement being in the direction of the hopper. From the upper face of each of the bars 24 projects a series of pins 25, which engage the hay or straw that is placed in the outer end of the chute and urge it in the direction of the hopper. To rotate the crank-shafts, the sweep 15 is provided with a horizontal gear 26, which meshes with a gear 27 on a shaft 28, which extends in the direction of the hopper and which at its end next to the hopper is provided with a sprocket-wheel 27'. A stub-shaft 28' is mounted upon the end of the press and carries a pair of sprocket-wheels 29 and 30, which are connected for simultaneous rotation. On the shafts 22 and 23 are sprocket-wheels 31 and 32, respectively. A chain 33 connects the sprocket-wheels 27' and 29, and a second chain 34 connects the sprocket-wheels 30, 31, and 32, so that as the sweep is carried around the bars 24, termed "packer-bars," are operated.

To rotate the crank-shaft 17 and operate the tramper, the shaft 22 is provided with a sprocket-wheel 35, with which is engaged a chain 36, which engages also a sprocket-wheel 37, said chain and sprocket-wheels being at the opposite side of the chute from the sprocket-wheel 31.

The end of the chute adjacent to the hopper is covered, as illustrated at 37', and at the front and rear edges, respectively, of the cover are journaled the shafts 38 and 39, carrying sprocket-wheels 40 and 41, respectively, with which are engaged chains 42 and 43, respectively, that pass below the cover longitudinally of the chute and then upwardly and over the cover, as illustrated, and in spaced relation thereto, each of the chains being provided with fingers 44 of such length as to reach very nearly to the bottom of the chute as they pass longitudinally thereof as the shafts 38 and 39 are rotated. The fingers are designed to feed the material to be baled through the covered portion of the chute and into the hopper, and they travel in a corresponding direction. In order that these feeding-fingers may act only when the tramper is in raised position with its base above the floor of the chute, the shaft 38 is provided with a pinion 45, which is engaged at intervals by the teeth of the mutilated gear-wheel 46, which is carried by the shaft 17, these teeth being so positioned on the gear-wheel that they will engage the pinion during an angular movement of the gear-wheel of approximately one hundred and twenty degrees when the tramper is in raised position. Thus when the tramper is in position to permit of passage of material beneath it into the hopper the feeders will be actuated.

With the construction described it will be noted that packers, including the rods 24 and the fingers 25, will be continuously operated, but that the fingers are so short and operate upon the material in such position that comparatively slight resistance to the passage of the material will render the packers ineffective. To render the packers effective, a gate is provided, comprising a bar 50, from which depend fingers 51 into the chute, the bar being so positioned that the lower ends of the fingers may lie slightly in the rear of the packers when the fingers are in the chute. From the rod 50 depends a crank-arm 52, to the lower or free end of which is pivoted a rod 53, which extends in the direction of the hopper 16 through a guide 54, said rod having at its free end a roller 55. On the face of the wheel 46 is a cam 56, and as the wheel 46 rotates and its teeth move out of engagement with the pinion 45 the cam strikes the roller 55 and by pressing thereagainst forces the rod 53 longitudinally, so as to swing the fingers 51 downwardly into the chute in position to prevent passage of material into the covered portion of the seat for engagement by the feeding-fingers. The cam 56 holds the rod 53 in its rearward position until the tramper has descended and pressed the material down into the baling-chamber and has returned to position to permit of passage of material into the hopper beneath the tramper. The cam then releases the rod 53 by passing from contact with the roller 55, and the fingers 51 are permitted to swing in the direction of the hopper, so the material to be baled may pass into the covered portion of the chute to be engaged by and pass onward by the feeding-fingers.

At the rear of the hopper is an opening 60 in the top of the hopper, which permits of inserting the ordinary block previous to formation of the bale. The opening 60 is somewhat wider than the block illustrated at 61, and the opening is divided by a cross-bar 62 between the block and the hopper, and a vertically-movable gate is slidably disposed between the bar and the hopper, the gate being provided with a handle 64 for raising and lowering it. This gate prevents the loose hay from getting into the way of the block during the tramping operation.

What is claimed is—

1. The combination with a baling-press including a baling-chamber, a hopper communicating with the chamber, a baling-plunger and means for operating said plunger, of a tramper mounted for movement from the hopper into the baling-chamber, means connected between the tramper and the plunger-operating means for operating the tramper, a chute connected with the hopper, means for feeding material to be baled through the chute to the hopper, and means for operating the feeding means intermittently.

2. The combination with a baling-press including a baling-chamber, a hopper communicating with the chamber, a baling-plunger and means for operating said plunger, of a tramper mounted for movement from the hopper into the baling-chamber, means connected between the tramper and the plunger-operating means for operating the tramper, a chute connected with the hopper, means for feeding material to be baled through the chute to the hopper, and means for intermittently operating the feeding means from the tramper-operating means.

3. The combination with a baling-press including a baling-chamber, a hopper communicating with the chamber, a baling-plunger and means for operating said plunger, of a tramper movable through the hopper and into the baling-chamber, a chute communicating with the hopper, means for urging material in the chute in the direction of the hopper, means for operating said urging means continuously with the tramper, means for feeding the material from the urging means to the hopper and means for holding the material at times against the action of the urging means.

4. The combination with a baling-press including a baling-chamber, a hopper communicating with the chamber, a baling-plunger, and means for operating the latter, of a chute leading to the hopper, a tramper movable through the hopper into the chamber, means including a crank-shaft and connected with the plunger-operating means for actuating the tramper, a mutilated gear-wheel on the crank-shaft, means for feeding material from the chute to the hopper, an actuating-pinion for said feeding means disposed for intermittent engagement by the mutilated gear, means located in advance of the feeding means for urging material in the direction of the feeding means, means for operating the urging means continuously with the plunger, a rock-bar, fingers carried by the rock-bar and movable therewith into and out of position between the urging means and the feeding means, a crank-arm for the rock-bar, an actuating-rod pivoted to the crank-arm and a cam carried by the mutilated gear disposed to intermittently engage and shift the actuating-rod with said fingers into active position.

In testimony whereof I affix my signature in presence of two witnesses.

EUGENE W. SHAW.

Witnesses:
M. A. SHAW,
GEORGE W. DAVIS.